US006982233B2

(12) United States Patent
Buchberger et al.

(10) Patent No.: US 6,982,233 B2
(45) Date of Patent: Jan. 3, 2006

(54) FIRE REFRACTORY CERAMIC MOLDED PIECE, USE THEREOF AND COMPOSITION FOR PRODUCTION OF MOLDED PIECES

(75) Inventors: Bernd Buchberger, Trofaiach (AT); Markus Horn, Lich (DE); Roland Nilica, Leoben (AT)

(73) Assignee: Refractory Intellectual Property GmbH & Co., (AT)

( * ) Notice: Subject to any disclaimer, the term of this patent is extended or adjusted under 35 U.S.C. 154(b) by 0 days.

(21) Appl. No.: 10/477,869

(22) PCT Filed: Nov. 8, 2002

(86) PCT No.: PCT/EP02/12489

§ 371 (c)(1),
(2), (4) Date: Nov. 12, 2003

(87) PCT Pub. No.: WO03/053879

PCT Pub. Date: Jul. 3, 2003

(65) Prior Publication Data

US 2004/0142812 A1    Jul. 22, 2004

(30) Foreign Application Priority Data

Dec. 8, 2001   (DE) ................. 101 60 366

(51) Int. Cl.
*C04B 35/047*   (2006.01)
*C04B 35/443*   (2006.01)
*C04B 35/106*   (2006.01)

(52) U.S. Cl. .............. 501/120; 501/104; 501/105; 501/117

(58) Field of Classification Search ............... 501/117, 501/120, 104, 105
See application file for complete search history.

(56) References Cited

U.S. PATENT DOCUMENTS

| 4,348,485 | A  | * | 9/1982 | Oohasi et al. | ............... 501/115 |
| 6,261,983 | B1 | * | 7/2001 | Gruver | ........................ 501/120 |
| 6,274,525 | B1 | * | 8/2001 | Zborowski et al. | ......... 501/120 |

FOREIGN PATENT DOCUMENTS

| DE | 197 27 917 C1 | | 1/1999 |
| EP | 0 210 457 A1 | | 2/1987 |
| JP | 8-34666 | * | 2/1996 |
| WO | WO 99 01399 A | | 1/1999 |

OTHER PUBLICATIONS

Levy, D., et al.: "Chromium Crystal Chemistry Mullite-Spinel Refractory Ceramics," Materials Research Bulletin, Elsevier Science Publishing, New York, U.S., Mar. 15, 1999, pp. 711-720, vol. 35, No. 5.
Schulle, Wolfgang: "Feuerfeste Werkstoff," 1990, pp. 288, 289.

* cited by examiner

*Primary Examiner*—Karl Group
(74) *Attorney, Agent, or Firm*—Christopher L. Parmelee; Marcella R. Louke; Walker & Jocke, LPA

(57) ABSTRACT

The invention relates to a fired refractory ceramic molded piece with a spinel matrix based on $(Mg)^{2+}(Al, Cr)_2^{3+}O_4$, in which coarser particles based on chromium corundum and/or corundum and coarser particles based on $ZrO_2$ are present.

20 Claims, 1 Drawing Sheet

Figure 1:
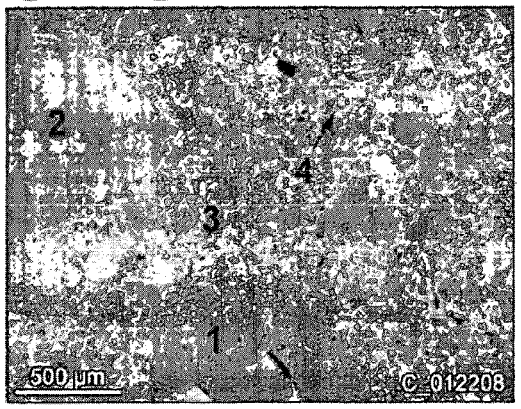

FIRE REFRACTORY CERAMIC MOLDED PIECE, USE THEREOF AND COMPOSITION FOR PRODUCTION OF MOLDED PIECES

DESCRIPTION

The invention concerns a fired refractory ceramic molded piece, a possible use, as well as a composition for the production of said molded piece.

From Schulle "Refractory Materials", 1$^{st}$ Edition, 1990 (ISBN 3-342-00306-5), pp. 288, 289, refractory materials based on chromium corundum, with a proportion of around 10% by weight $CrO_2$ and about 90% by weight $Al_2O_3$ are known. Also mentioned there are refractory materials based on $Cr_2O_3/ZrO_2$. At the same time, it is also noted that the use of materials of this type as refractory ceramics is little known.

In DE 197 27 917 C1 is described a composition of 5 to 35% by weight $Cr_2O_3$ with a grain size <0.1 mm, 1 to 10% by weight $ZrO_2$ with a grain size between 0.5 and 4 mm, as well as 55 to 94% by weight $Al_2O_3$ with a grain size between 0.2 and 4.0 mm for the manufacture of fired refractory ceramic molded pieces that can be used in slag-carrying furnaces with great thermal shock resistance and high operating temperatures, for example in rotary furnaces for burning garbage. Good structural elasticity and good corrosion-resistance are reported of these bricks.

However, in incinerator plants for special waste there is always a high degree of corrosion of the matrix of the refractory material. This is true particularly for strongly alkaline slags, or for slags with a high iron oxide content, or with slags whose C/S ratio (basicity) is variable during the respective process. Here, even bricks burned from a composition in accordance with DE 197 27 917 C1 may reach their limits, in other words, exhibit unsatisfactory wear characteristics.

The objective of the invention is to offer molded pieces that, in contrast to products according to DE 197 27 917 C1 exhibit better corrosion resistance, especially improved corrosion resistance with respect to slag with variable/changing basicity.

Application areas for such pieces may be: linings in waste incinerator plants and other furnaces/melting equipment, or in gasification plants, in which aggressive melts and/or slags are encountered.

The basic idea of the invention is, in particular, to fashion the matrix of the molded piece to be more stable (more resistant) in the face of an aggressive slag.

A fired refractory ceramic molded piece according to the invention is distinguished in its most general embodiment by a spinel mixture matrix, in which relatively coarse grains based on corundum and/or chromium corundum, as well as $ZrO_2$ are present. The desired product properties are achieved, for example, by the simultaneous presence of chromium corundum and zirconium corundum, or by the simultaneous presence of corundum and zirconium mullite.

The spinel mixture matrix can be produced from appropriate composition components such as $Cr_2O_3$, MgO, or $Al_2O_3$ as individual components and/or in the form of pre-synthesized spinels, in particular MA-spinels ($MgO—Al_2O_3$) or MCA-spinels, in particular ($MgO—Cr_2O_3—Al_2O_3$), or by other means.

The chromium corundum grains have their origin in the composition in the oxides of chromium and aluminum, and are created during the firing process. They may also be introduced, at least partially, as previously reacted components.

The $ZrO_2$-containing grains may be derived from baddeleyite-containing material (raw material), or, for example, from sinter-zirconium mullite, melt zirconium mullite, sinter zirconium corundum, melt zirconium corundum, or from a ZAC material (pre-reacted material of $SiO_2$, $ZrO_2$ and $Al_2O_3$), separately or in a mixture.

A composition component based on an MA-spinel [$(MgO, Al_2O_3)$]-spinel, in a fraction of <0.5 or <0.3 or <0.1 mm may be used. This spinel, which preferably is not stoichiometiric, say, for example, with an excess of MgO, reacts with the chromium oxide of the composition to form a mixed spinel in the form of $(Mg)^{2+} (Al, Cr)_2^{3+}O_4$ and forms essential positions of the base material of the matrix of the fired product. This mixed spinel exhibits an outstanding resistance relative to the named critical slags.

Aluminum oxide, especially as a component in the grain-size range of 0.5–10 mm, can react with (fine-particled) chromium oxide, and leads to the already mentioned chromium corundum grains, which are distributed within the matrix the same as the said $ZrO_2$-containing grains.

It is self-evident that, depending on the degree of contamination of the raw materials, additional ingredients may be present in the composition components, and thus become secondary constituents of the molded piece.

The aforementioned coarse grains in the fired product may attain an average diameter ($d_{0.50}$) between 0.5 to 10 mm.

The chromium oxide concentration within the chromium corundum grains can fluctuate, depending on the firing temperature and furnace atmosphere, as well as on the proportions of chromium oxide or corundum ($Al_2O_3$), while the firing process can be managed in a way such that within the chromium corundum grains there remains at least one zone, especially a core zone, that is free of chromium oxide.

Correspondingly, the firing process can be controlled so that the chromium grains have their highest chromium oxide concentration within the region close to their surface.

Figure 2:
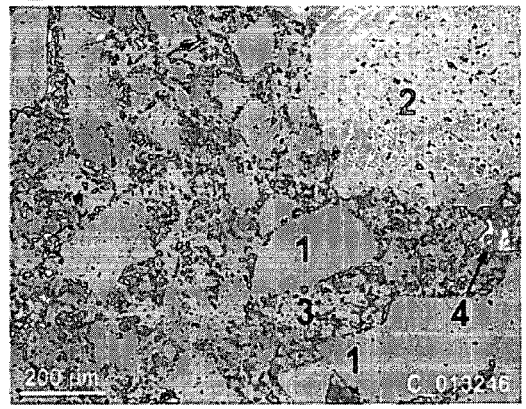
Figure 3:
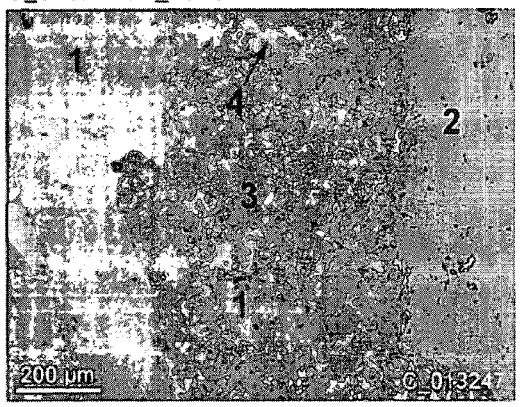
Figure 4:
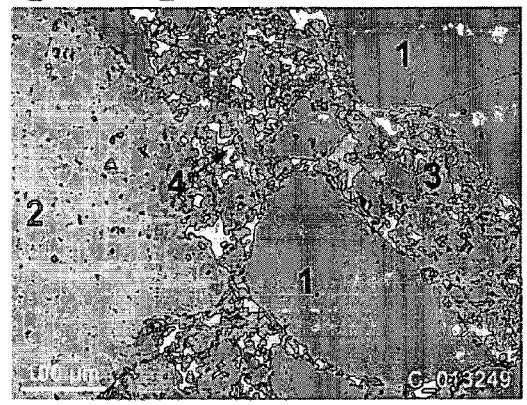

FIGS. 1 to 4 show microscopic photographs on the indicated scale of ground surfaces of a fired product. In them, the numbers signify: 1. Chromium corundum grains; 2. Zirconium corundum grains; 3. Mixed spinel matrix; 4. Pores. The coarse grains based on chromium corundum and zirconium corundum are distinctly visible in the fine-grained spinel matrix.

The matrix component, i.e. the proportion consisting essentially of the named mixed spinel, may constitute between 10 and 70% by weight of the total mass, and usually between 15 and 50% by weight.

By virtue of its outstanding stability, particularly vis-à-vis aggressive slags, such as alkali-containing slags, or slags with a high iron oxide content, the fired refractory ceramic molded piece is suitable for the lining of a furnace for burning refuse, for example for the incineration of special refuse, where slags of this type occur.

The composition (batch) for producing the previously named molded piece encompasses, in its most generalized implementing form, the following components (which, alone, or with additional components, add up to 100% by weight):

2 to 35% by weight chromium oxide <0.5 mm,
1 to 15% by weight zirconium dioxide >0.2 mm,
1 to 12% by weight magnesium oxide <0.5 mm,
38 to 96% by weight aluminum oxide <10 mm.

The components being added to the composition may be pure oxides or materials that introduce the named oxides into the composition in the stated proportions.

A particularly conspicuous aspect of this composition process lies in the fact that the composition, using exclusively a temporary binding agent, e.g. sulfite waste liquor, can be manufactured into molded pieces, firing them subsequently, at which time the sulfite waste liquor is to almost entirely burned off.

By dint of the invention, that is, the use of, e.g. phosphate-containing binding agents can be avoided, which represents an additional substantial advantage vis-à-vis the state of the art.

Contrariwise, the composition according to DE 197 27 917 C1 cannot be processed with an exclusively temporary binding agent such as sulfite waste liquor. With the known composition, it is impossible with a temporary binding agent to achieve an adequate degree of firmness in the pre-firing state.

The composition may be varied within the scope of the following provisions:

The grain-size fraction of the $Al_2O_3$ component may be <6 mm or <4 mm,

The grain-size fraction of the $ZrO_2$-containing component can be between 1 and 4 mm, The grain-size fractions of $Cr_2O_3$ and MgO may be <0.2 mm, <0.1 mm, or also >0.05 mm, $Al_2O_3$, $Cr_2O_3$ and/or MgO may be introduced, first of all, at least partially as spinel, particularly MA- or MCA spinel, at 5 to 25% by weight, for example, Where MgO is present at least partially as spinel, the $Al_2O_3$ or $Cr_2O_3$ component needs to be reduced proportionally, The content of $Cr_2O_3$ may be set at 5 to 25% by weight, The $ZrO_2$ content in the composition may be 1 to 6% by weight, The $Al_2O_3$ component in the composition may be between 64 and 87% by weight of the total composition, and a portion may be present in a fine fraction (<0.1 mm), The $SiO_2$ content should be limited to <3.0% by weight or, better: <0.1% by weight.

In this connection, it is recommended that a $ZrO_2$-containing component be used which, if possible, is free of $SiO_2$ content, The $Fe_2O_3$ content may be <0.5% by weight, The MgO content in the composition may amount 3 to 8% by weight, The $Al_2O_3$ content may be added at least in part as chromium corundum, The MA-spinel can, by way of example, consist of the following components (all data are in % by weight):

| | |
|---|---|
| MgO: | 31–35 |
| $Al_2O_3$: | 64–67 |
| CaO: | 0.3–0.6 |
| $Fe_2O_3$: | 0.1–0.3 |

Besides other components such as $Na_2O$, $SiO_2$, whose respective proportion amounts to <0.2% by weight.

The composition, including its temporary binding agent, is prepared in the usual manner, and fabricated into molded pieces, principally by pressing. It is subsequently fired at temperatures between 1,200 and 1700° C.

Starting with a composition of:

8% by weight chromium oxide <0.1 mm

5% by weight zirconium corundum 0.5 to 4 mm

15% by weight non-stoichiometric MA-spinel (of previously mentioned type) <0.1 mm Remainder corundum <4 mm, and adding 3% by weight sulfite waste liquor (relative to the total of components), bricks were pressed at 100 MPa pressure, and fired at 1,550° C. The bricks exhibited the following characteristic values:

| | |
|---|---|
| Rough density (per DIN EN 993-1): | 3.35 g/cm$^3$ |
| Open porosity (per DIN EN 993-1): | 15.1% |
| Cold compression strength (per DIN 51607): | 170 N/mm$^2$ |
| Softening under pressure (per DIN 51053 T1): | $T_0 > 1,700°$ C. |
| Thermal shock resistance (per DIN EN 993, Part 11, relative to water): | >30 cycles. |

These values fall within the range of bricks according to DE 197 27 917 C1. However, the bricks according to the invention prove to be distinctly superior in their corrosion resistance, particularly vis-à-vis the cited critical slags. Their resistance in a laboratory test (slagging test in an induction crucible furnace) was 30% higher.

What is claimed is:

1. A fired refractory ceramic molded piece with a spinel matrix comprising particles based on $(Mg)^{2+}$ $(Al, Cr)_2^{3+}O_4$, in which particles based on chromium corundum and/or corundum and particles based on $ZrO_2$ are present, all said particles based on chromium corundum, corundum and $ZrO_2$ being coarser than the particles of the spinel matrix.

2. The fired refractory ceramic molded piece according to claim 1, in which the coarser particles consist of chromium corundum and zirconium corundum.

3. The fired refractory ceramic molded piece according to claim 1, in which the corundum and/or chromium corundum particles have an average diameter ($d_{0.50}$) of 0.5 to 10 mm.

4. The fired refractory ceramic molded piece according to claim 1, in which the $ZrO_2$-containing particles have an average diameter ($d_{0.50}$) of 0.5 to 10 mm.

5. The fired refractory ceramic molded piece according to claim 1, in which the spinel matrix constitutes 10 to 70% by weight of the total mass.

6. A composition (batch) for the manufacture of a molded piece according to one of the claims 1 to 5, with 2 to 35% by weight $Cr_2O_3$ in a grain size fraction <0.5 mm, 1 to 15% by weight $ZrO_2$, in a grain-size fraction > or equal to 0.2 mm, 1 to 12% by weight MgO in a grain-size fraction of < 0.5 mm, 38 to 96% by weight $Al_2O_3$ in a grain-size fraction of <10 mm.

7. The composition in accordance with claim 6, in which at least a part of the MgO, $Al_2O_3$, or $Cr_2O_3$ is present as a spinel.

8. The composition according to claim 7, comprising an MgO—$Al_2O_3$— or an MgO—$Cr_2O_3$—$Al_2O_3$-spinel.

9. The composition according to claim 6, in which the $Cr_2O_3$ content is 5 to 25% by weight.

10. The composition according to claim 6, in which the $ZrO_2$-content is between 1 and 6% by weight.

11. The composition according to claim 10, in which the $Al_2O_3$-content is between 64 and 87% by weight.

12. The composition according to claim 6, with an $Fe_2O_3$-content <0.5% by weight.

13. The composition according to claim 6, in which the $ZrO_2$ content is fashioned by a baddelyite-containing raw material.

14. The composition according to claim 6, in which the $ZrO_2$ content is made up by a sinter-zirconium mullite, melt-zirconium mullite, sinter zirconium corundum, melt zirconium corundum or a prereacted material of $SiO_2$, $ZrO_2$ and $Al_2O_3$, separately or as a mixture.

15. The composition according to claim 6, in which the $ZrO_2$ content is present in a grain size of between 1 and 4 mm.

16. The composition according to claim 6, with an $MgO$—$Al_2O_3$-spinel content of between 5 and 25% by weight.

17. The composition according to claim 6, in which at least one of $Cr_2O_3$— and $MgO$ is present in a grain size of <0.2 mm.

18. The composition according to claim 6, in which at least one of $Cr_2O_3$ and $MgO$ is present in a grain-size fraction of <0.1 mm.

19. The composition according to claim 6, in which up to 30% by weight of the composition is present as $Al_2O_3$ in a grain-size fraction of <0.1 mm.

20. The composition according to claim 6, in which $Al_2O_3$ is present in a grain-size fraction of >0.2 mm.

* * * * *